United States Patent
Chen et al.

(10) Patent No.: US 8,467,963 B2
(45) Date of Patent: Jun. 18, 2013

(54) MAP BUILDING SYSTEM, BUILDING METHOD AND COMPUTER READABLE MEDIA THEREOF

(75) Inventors: Yung-Yu Chen, Pingtung County (TW); Shyang-Jye Chang, Taipei County (TW); Kuo-Chang Chen, Nantou County (TW)

(73) Assignee: Industrial Technology Research Institute, Hsin-Chu (TW)

( * ) Notice: Subject to any disclaimer, the term of this patent is extended or adjusted under 35 U.S.C. 154(b) by 456 days.

(21) Appl. No.: 12/850,322

(22) Filed: Aug. 4, 2010

(65) Prior Publication Data

US 2011/0153196 A1     Jun. 23, 2011

(30) Foreign Application Priority Data

Dec. 18, 2009   (TW) ................................. 98143626 A

(51) Int. Cl.
    *G01C 21/10*    (2006.01)
(52) U.S. Cl.
    USPC ............................ 701/500; 701/502; 701/503
(58) Field of Classification Search
    None
    See application file for complete search history.

(56) References Cited

U.S. PATENT DOCUMENTS

| | | | |
|---|---|---|---|
| 5,377,106 A | 12/1994 | Drunk et al. | |
| 6,415,223 B1 | 7/2002 | Lin et al. | |
| 6,876,945 B2 * | 4/2005 | Emord | 702/150 |
| 6,944,542 B1 | 9/2005 | Eschenbach | |
| 2010/0328316 A1 * | 12/2010 | Stroila et al. | 345/441 |

FOREIGN PATENT DOCUMENTS

| | | |
|---|---|---|
| CN | 1161268 A | 10/1997 |
| CN | 101082498 A | 12/2007 |

OTHER PUBLICATIONS

State Intellectual Property Office of the People's Republic of China, "Office Action", Apr. 19, 2012, China.

\* cited by examiner

*Primary Examiner* — Paul Danneman
(74) *Attorney, Agent, or Firm* — Morris Manning & Martin LLP; Tim Tingkang Xia, Esq.

(57) ABSTRACT

A map building system, method and computer readable media thereof are provided, which are applied to a movable apparatus or which with a server apparatus. The system includes at least two distance sensing units, a inertial sensing unit, a parameter processing unit, and a display unit. The distance sensing units detect a distance between the movable device and at least one obstacle object and create at least two range data. The inertial sensing unit detects moving mode of the movable device and creates at least one moving data. The parameter processing unit calculates an area map data according the range data and the moving data. The area map data is shown on the display unit.

22 Claims, 14 Drawing Sheets

MAP BUILDING SYSTEM, BUILDING METHOD AND COMPUTER READABLE MEDIA THEREOF

CROSS-REFERENCE TO RELATED APPLICATIONS

This non-provisional application claims priority under 35 U.S.C. §119(a) on Patent Application No(s). 098143626 filed in Taiwan, R.O.C. on Dec. 18, 2009, the entire contents of which are hereby incorporated by reference.

TECHNICAL FIELD

The present disclosure relates to a map building system, more particularly to, a map building system, building method and computer readable media thereof, which uses peripheral obstacle detection techniques and apparatus displacement detection method.

TECHNICAL BACKGROUND

In the prior arts, in a spatial area a navigation is done as follows:

Firstly, in a spatial area an RFID sensing system is installed so as to sense the sensed unit on the user and thus judging a location in the spatial area for the user.

Secondly, GPS navigation system cooperates with a telecommunication base station and an INS, (Inertial Navigation System) is installed on the user's cellular phone. When the user enters a spatial area, by means of the INS, which senses a corresponding displacement information for a sensing cellular phone (including displacement velocity and location) to be transmitted to the base station. GPS system provides a disconnected position where the connection between itself and the cellular phone is broken to the base station for which can calculate an absolute position information, and then the base station uses the absolute positioning information and the corresponding displacement information to obtain the present positioning information for the cellular phone and transmits the positioning information to the cellular phone for user's reference. However, the positioning information appears mostly the axial information.

TECHNICAL SUMMARY

The present disclosure relates to a map building system, comprises two distance sensing units, an inertial sensing unit, and a parameter processing unit, wherein all units are installed in a movable electronic apparatus. The distance sensing unit is for sensing a distance between the movable electronic apparatus and at least an obstacle so as to generate two distance parameters; the inertial sensing unit is for detecting a displacement for the movable electronic apparatus so as to generate at least a displacement parameter; the parameter processing unit is for calculating a area map according to the distance parameters and displacement parameters and a display unit for displaying the area map.

The present disclosure further relates to a map building method, applied to a movable electronic apparatus, comprises: sensing a distance between the movable electronic apparatus and at least an obstacle so as to generate at least two distance parameters; detecting a displacement for the movable electronic apparatus so as to generate at least a displacement parameter; and calculating a area map by the distance parameter and the displacement parameter and displaying the area map.

The present disclosure further relates to a computer readable medium, operable to the aforementioned map building method for a movable electronic apparatus to read program on the medium, the method comprises the steps of: sensing a distance between the movable electronic apparatus and at least an obstacle so as to generate at least two distance parameters; detecting a displacement for the movable electronic apparatus so as to generate at least a displacement parameter; and calculating a area map by the distance parameter and the displacement parameter and displaying the area map.

The outstanding technical content for the present disclosure relates to that when a user firstly enters an unknown spatial area, a map building system can be utilized to build a map data for the spatial area. The built map data is providing the movable electronic apparatus to undergo spatial area positioning and navigation at any time so as to exchange the map data with other apparatus.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DESCRIPTION OF THE EXEMPLARY EMBODIMENTS

For your esteemed members of reviewing committee to further understand and recognize the fulfilled functions and structural characteristics of the disclosure, several exemplary embodiments cooperating with detailed description are presented as the follows.

Figure 1A:
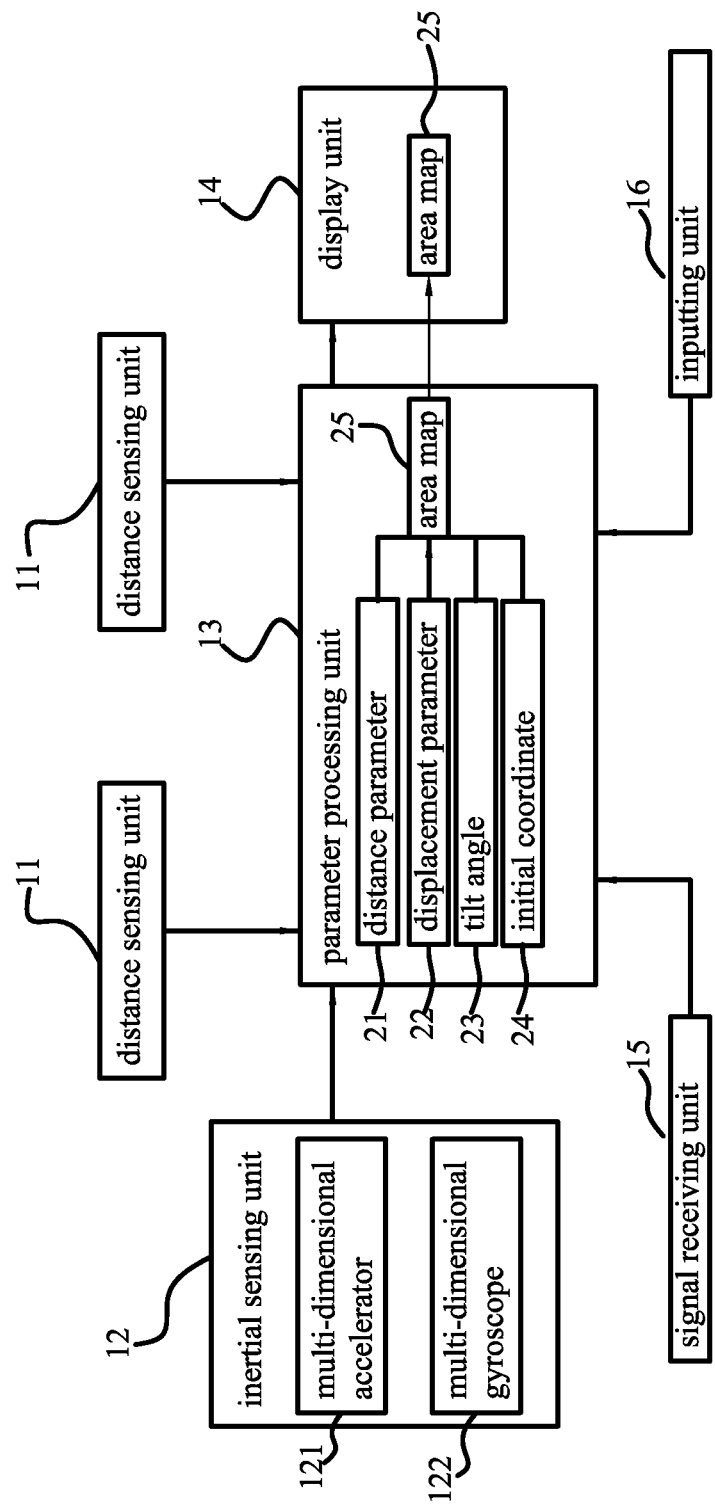
FIG. 1A relates to a first systematic block diagram for the preferred embodiment as the map building system disclosed in the present disclosure.
Figure 1B:
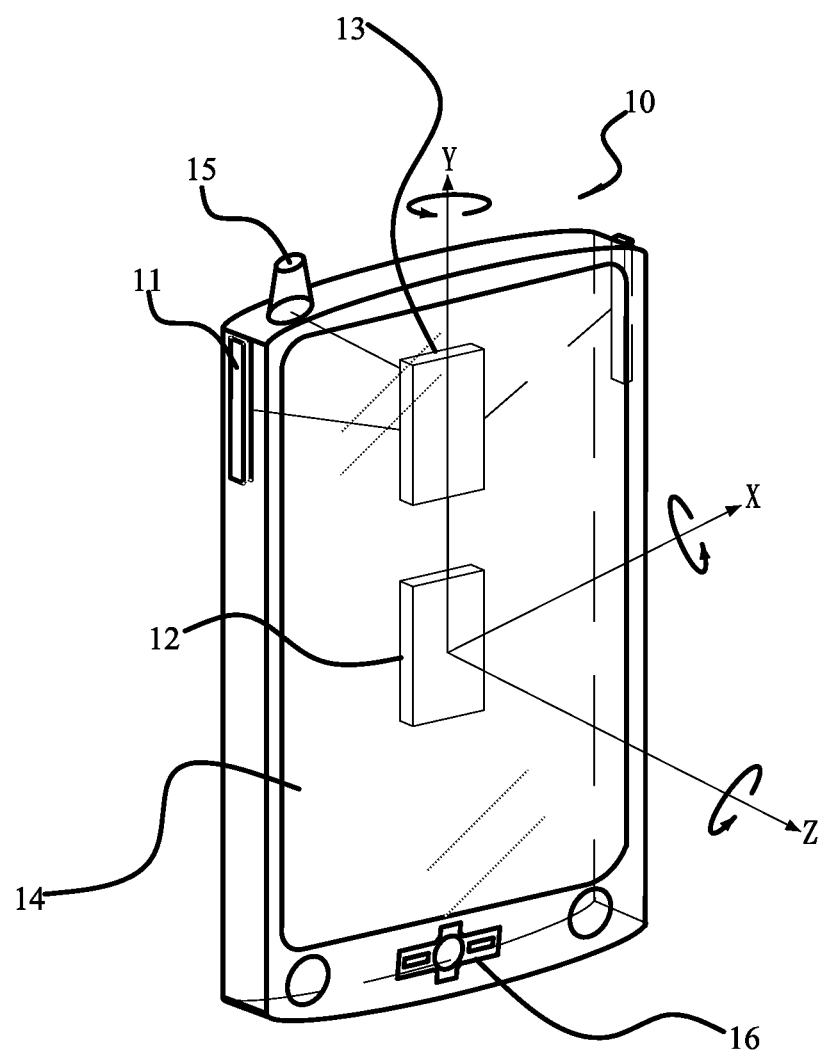
FIG. 1B relates to a first systematic structural diagram for the preferred embodiment as the map building system disclosed in the present disclosure.
Figure 1C:
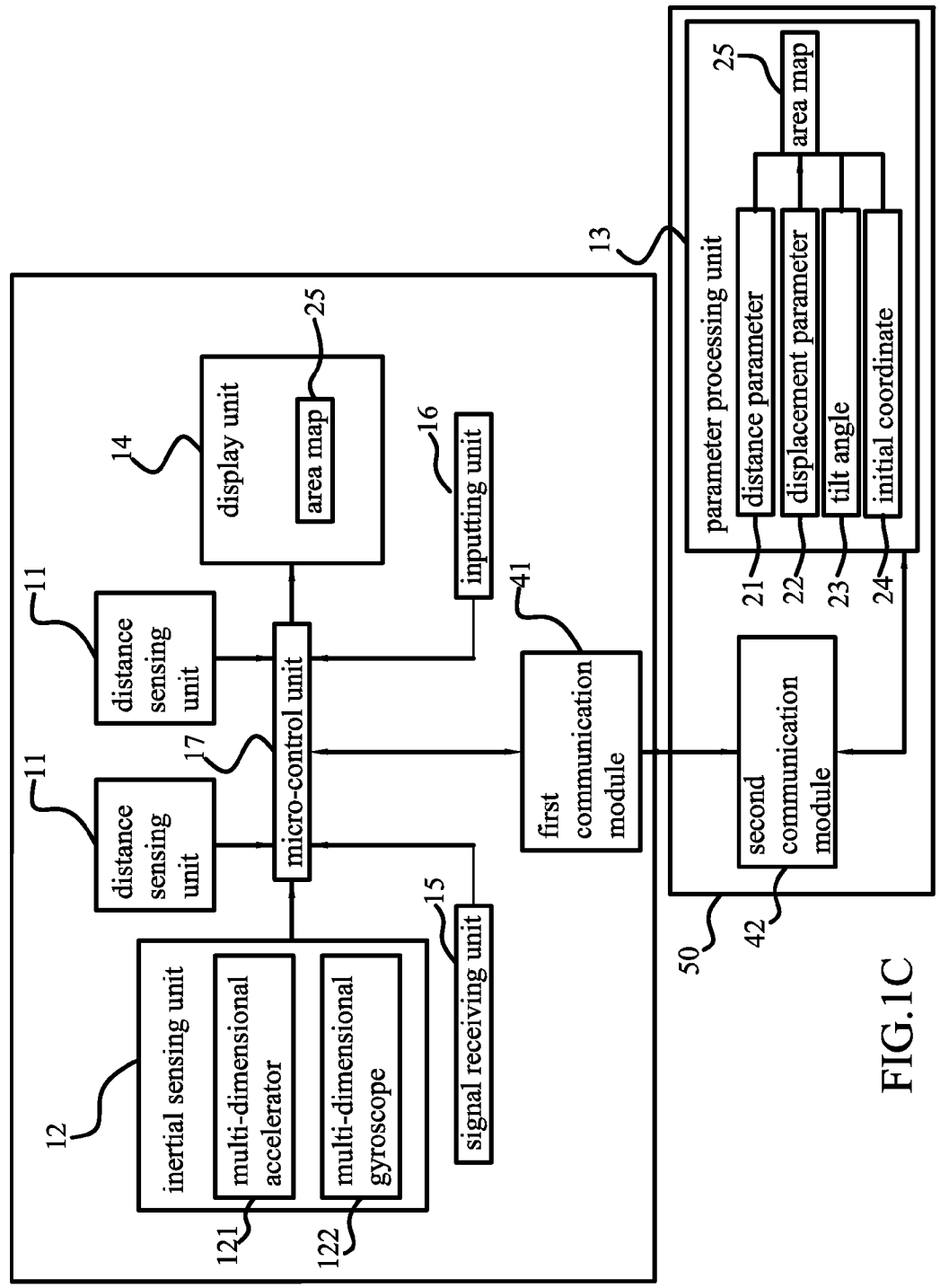
FIG. 1C relates to a second systematic block diagram for the preferred embodiment as the map building system disclosed in the present disclosure.
Figure 1D:
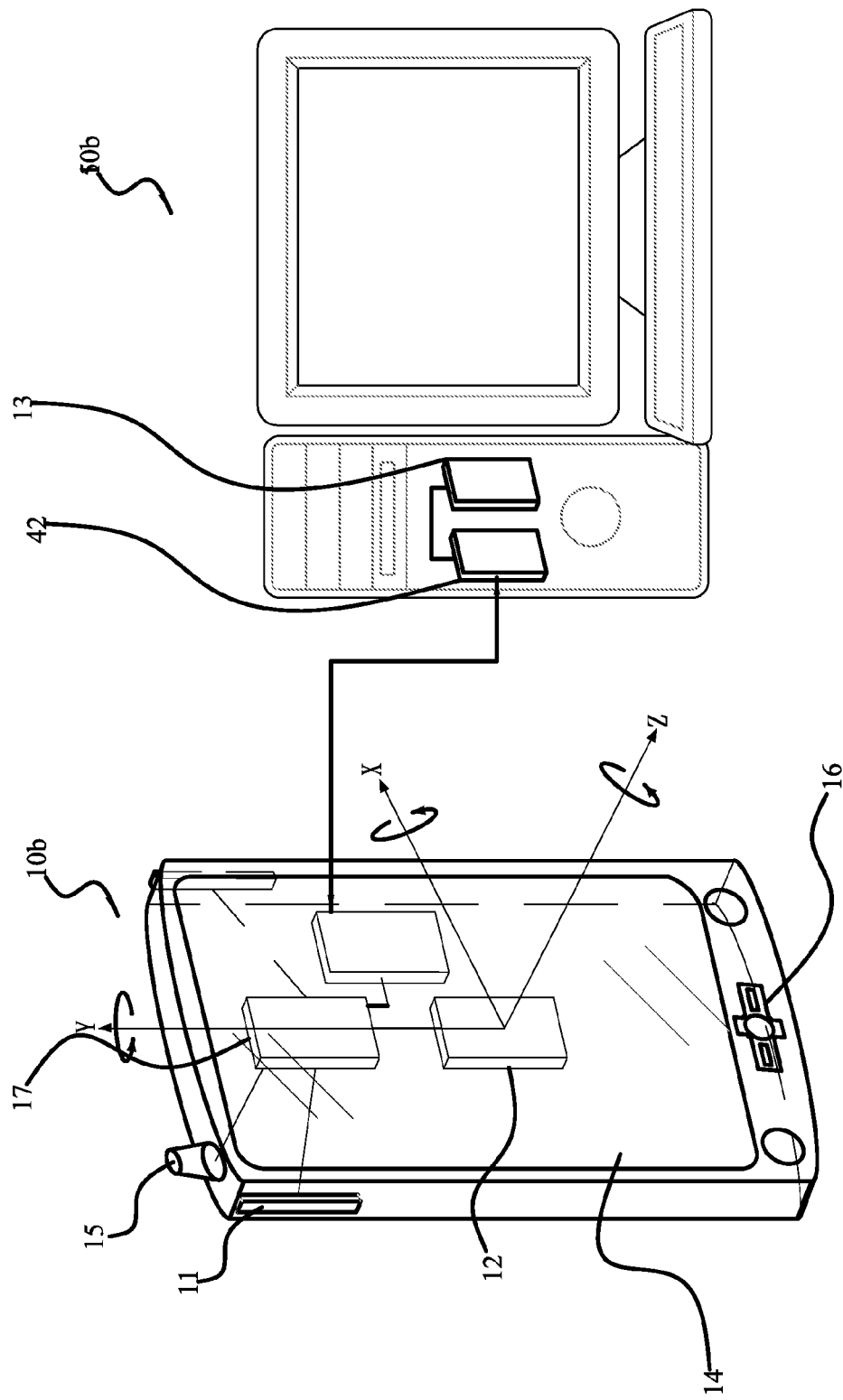
FIG. 1D relates to a first systematic structural diagram for the preferred embodiment as the map building system disclosed in the present disclosure.

Referring to FIG. 1A, which depicts a view of a first system block of the system embodiment of the map data building in the present disclosure. FIG. 1B depicts a view of a first system structural embodiment of the present disclosure. FIG. 1C depicts a view of a second system structural embodiment of the present disclosure. FIG. 1D depicts a view of second system structure according to the map building system embodiment according to the present disclosure, and FIG. 2 depicts a distance parameter amending view of the embodiment of the map building system according to the present disclosure.

The first system embodiment is illustrated by a movable electronic apparatus 10a, where the map building system comprises two distance sensing units 11, an inertial sensing unit 12, a parameter processing unit 13 and a display unit 14.

Hereby, the "map" refers to a map data, which depicts a concept map (no matter surface or cubical) for the corresponding spatial area according to the environment condition of the spatial area. The concept map is used to represent distribution of objects or obstacles of the spatial area, space size and shape, path distribution in the area, meaning of objects or obstacles inside the spatial area . . . one or more environment condition. Types of the map data is categorized such as are design map (indoor or outdoor), navigation map, path programming map, but not limited thereto, as long as the concept map which is applicable to exhibit a corresponding spatial area.

Figure 2:
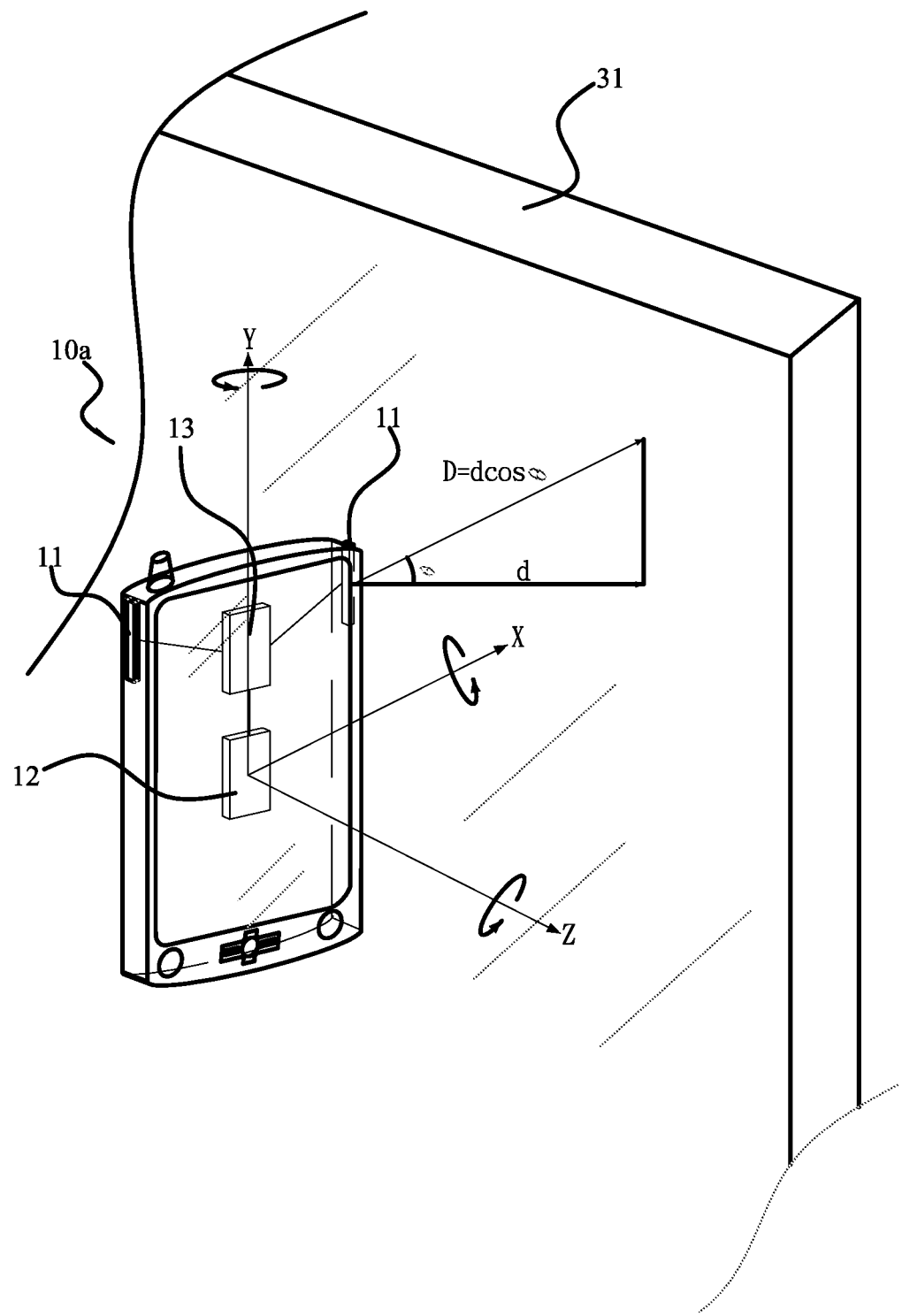
FIG. 2 relates to a view for the distance parameter correcting in the present disclosure.

As illustrated by FIG. 1A, FIG. 1B, and FIG. 2, the distance sensing unit 11 is disposed on the movable electronic apparatus 10a, and every distance sensing unit 11 is used for sensing the distance between the movable electronic apparatus 10a and its peripheral at least one obstacle 31, so as to generate at least one distance parameter 21, and two distance sensing units generate at least two distance parameters 21. In the present embodiment, the distance sensing unit 11 can be an infrared distance sensing unit or ultrasonic distance sensing unit, as illustrated in FIG. 2, the movable electronic apparatus 10a has two sides for which at each side a distance sensing unit 11 is disposed but the dispose number and unit categories are not limited thereto.

The inertial sensing unit 12 is disposed in the movable electronic apparatus 10a, for detecting the displacement of the movable electronic apparatus 10a so as to generate a displacement parameter 22 (including the displacement speed of the movable electronic apparatus 10a, displacement direction . . . displacement information). The inertial sensing unit 12 further comprises a multi-dimensional accelerator 121 and a multi-dimensional gyroscope 122, where the multi-dimensional accelerator 121 can be a two-dimensional accelerator or three-dimensional accelerator and the multi-dimensional gyroscope 122 can be a two-dimensional gyroscope or three-dimensional gyroscope. In the present embodiment the three dimensional accelerator/gyroscope are used as an example.

As illustrated in FIG. 1A, FIG. 1B, and FIG. 2, the inertial sensing unit 12 has a multi-dimensional accelerator 121 for detecting the displacement speed for the movable electronic apparatus 10a, and cooperating the multi-dimensional gyroscope to detect the displacement direction of the movable electronic apparatus 10a, and the multi-dimensional gyroscope 122 will detect the tilt angle 23 for the movable electronic apparatus 10a, (or alternatively a gesture angle for the movable electronic apparatus 10a).

The parameter processing unit 13 is disposed in the movable electronic apparatus 10a, which is electronically coupled to each of the distance sensing unit 11 and inertial sensing unit 12. The parameter processing unit 13 is for accessing the distance parameter 21 and displacement parameter 22 provided by the distance sensing unit 11 and the inertial sensing unit 12 so as to calculate a area map 25. The display unit 14 is for displaying the calculated area map 25 from the parameter processing unit 13. Wherein, the inertial sensing unit 12 provides the tilt angle for the movable electronic apparatus 10a to the parameter processing unit 13 for facilitating the parameter processing unit 13 to revise the distance parameter 21 by using the tilt angle 23 for the movable electronic apparatus 10a.

As illustrated in FIG. 2, suppose the distance sensing unit 11 detects the distance between the movable electronic apparatus 10a and obstacle 31 to be "d", and the inertial sensing unit 12 detects the tilt angle 23 for the movable electronic apparatus 10a to be θ, then the parameter processing unit 13 can obtain the actual distance parameter 21 to be D=d cos θ, but the revise mode is not limited thereto.

The movable electronic apparatus 10a further comprises a signal receiving unit 15, for receiving a satellite positioning signal. The movable electronic apparatus 10a enters a spatial area, where the apparatus 10a suffers from the environment condition of the spatial area (such as in the indoor space, or interfered by the neighbored base station transmitting signal), when the parameter processing unit 13 determines the signal strength of the satellite positioning is lower than a certain threshold, then the present position of the movable electronic apparatus 10a forms an initial coordinate 24, and the 24 is transmitted to the inertial sensing unit 12 for facilitating the inertial sensing unit to use the initial axis as a start point, to generate the aforesaid displacement parameter while combining the displacement data of the movable electronic apparatus 10a.

However, the parameter processing unit 13 further utilizes the displacement parameter 22 and the initial coordinate 24 to calculate the affixed positioning point corresponding to the area map 25 for the movable electronic apparatus 10a, and the display unit 14 further displays the affixed positioning on the area map 25.

Please refer to FIG. 1C and FIG. 1D simultaneously; the first system embodiment is presented by a combination of the movable electronic apparatus 10b and a server apparatus 50. It differs from the first system structure that, the parameter processing unit 13 is disposed on the server apparatus 50, and the movable electronic apparatus 10b and the server apparatus 50, respectively, undergo a mutual internet linking via a first communication module 41 and a second communication module 42 (to be wireline physical internet connection, wireless connection, and telecom connection, but not limited thereto), such that within the parameter processing unit 13 and the distance sensing unit 11, inertial sensing unit 12, and the display unit 14, a communication operation can be taken via a micro-control unit 17, the first communication module 41, and the second communication module 42.

The distance sensing unit 11 provides the distance parameter 21 and the inertial sensing unit 12 provides the displacement parameter 22 which will be acquired by the micro control unit 17, and the same will be transmitted to the parameter processing unit 13 via the first communication module 41 and the second communication module 42, for facilitate the calculation of the area map 25 being transferred to the micro control unit 17. And the micro control unit utilizes the display unit 14 to display the acquired area map 25.

In the same manner, the movable electronic apparatus 10b further comprises a signal receiving unit 15 for receiving the satellite positioning signal, when the micro control unit 17 determines the signal strength of the satellite positioning is lower than a certain threshold, and the result thereof is informed to the parameter processing unit 13. The parameter processing unit 13 is for recording the present positioning of the movable electronic apparatus so as to form an initial coordinate 24, and the 24 is transmitted to the inertial sensing unit 12 for facilitating the inertial sensing unit to use the initial axis as a start point, to generate the aforesaid displacement parameter 22 while combining the displacement data of the movable electronic apparatus 10a.

In addition, the parameter processing unit 13 further utilizes the displacement parameter 22 and the initial coordinate 24 to calculate the affixed positioning point corresponding to the area map 25 for the movable electronic apparatus 10a, and the affixed positioning point together with area map 25 is transferred back to the micro control unit 17 so as to facilitate the display unit 14 displaying the affixed positioning on the area map 25.

Figure 3A:
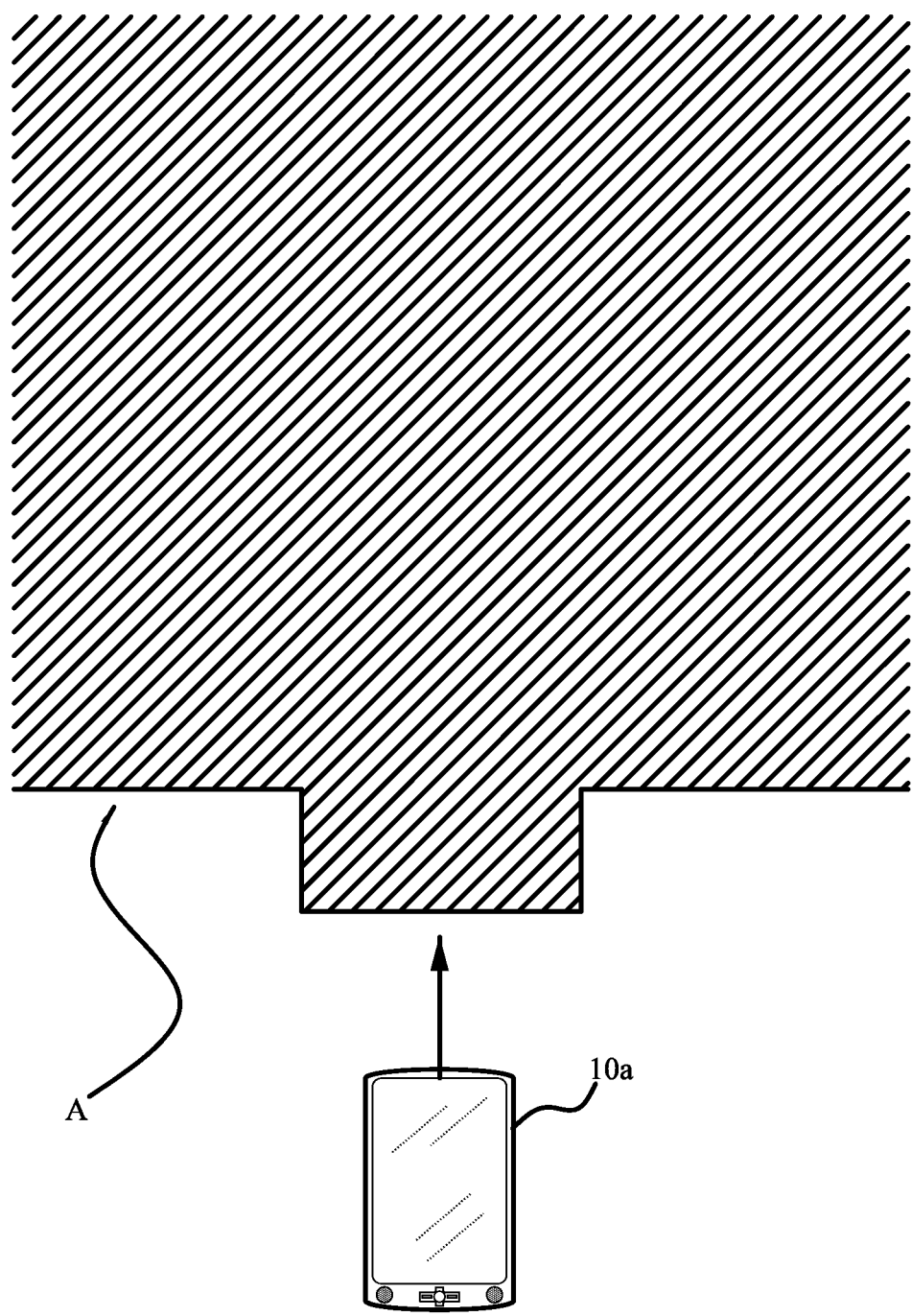
FIG. 3A~FIG. 3D relates to the map data establishment for the embodiments according to the present disclosure.
Figure 3B:
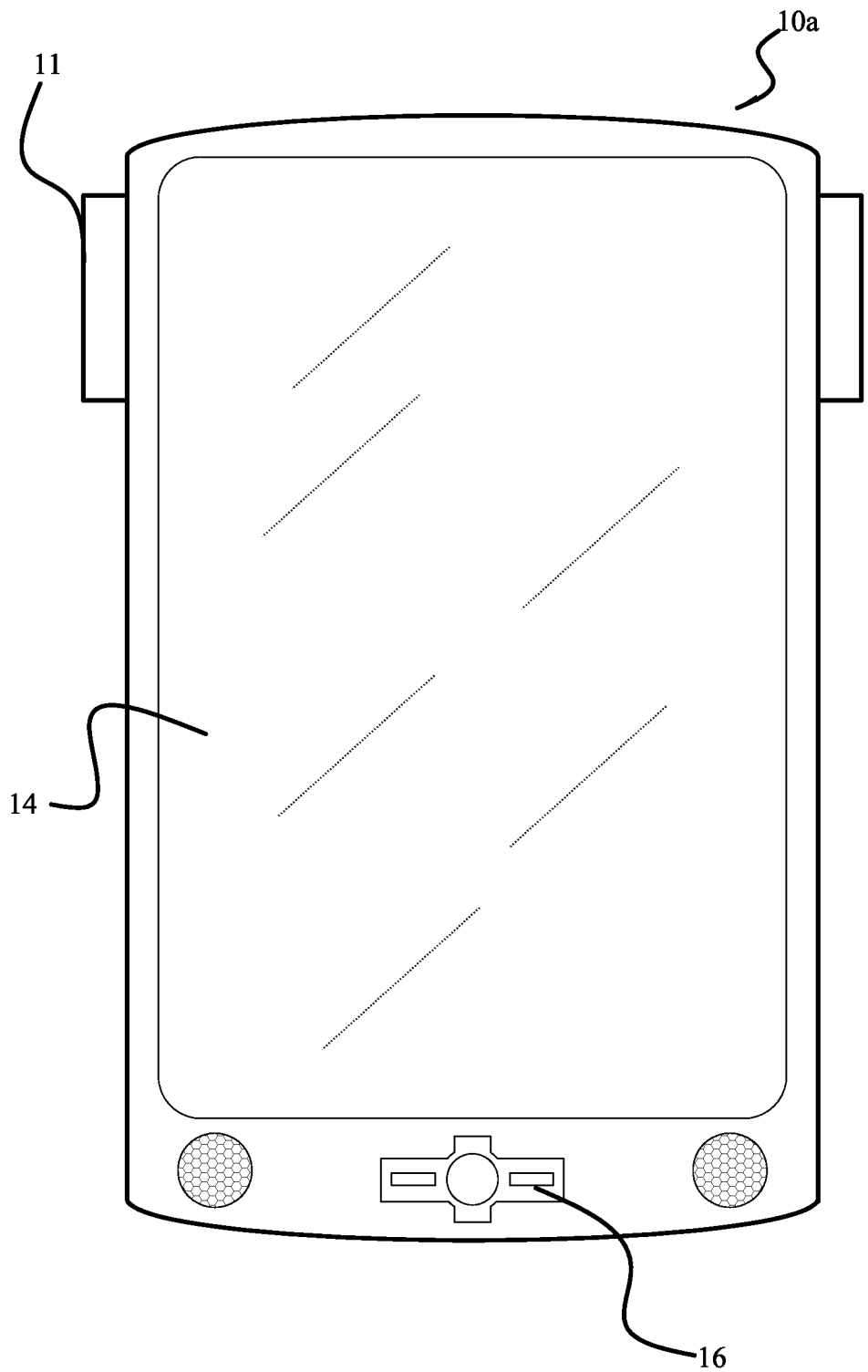
Figure 3C:
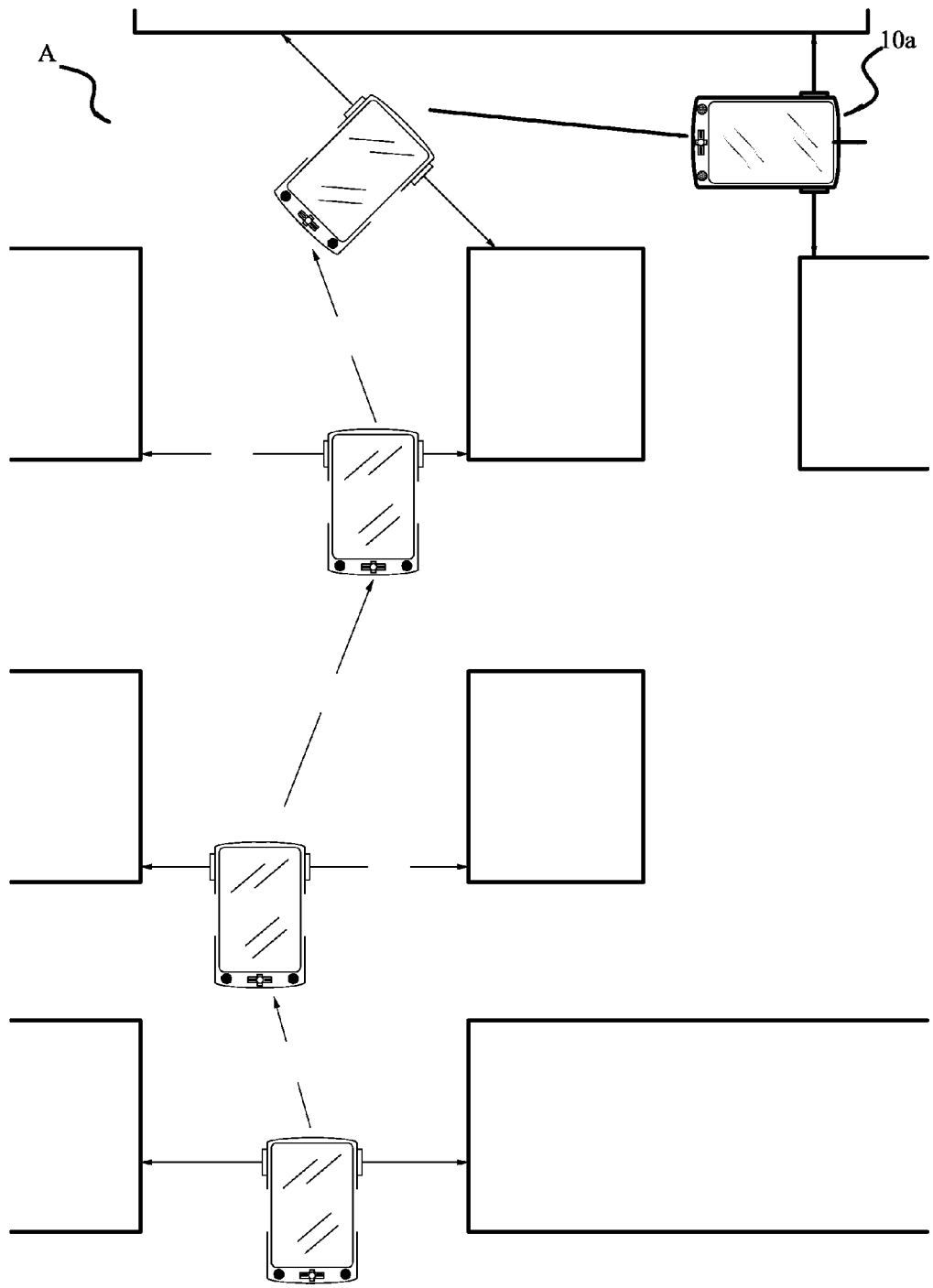
Figure 3D:
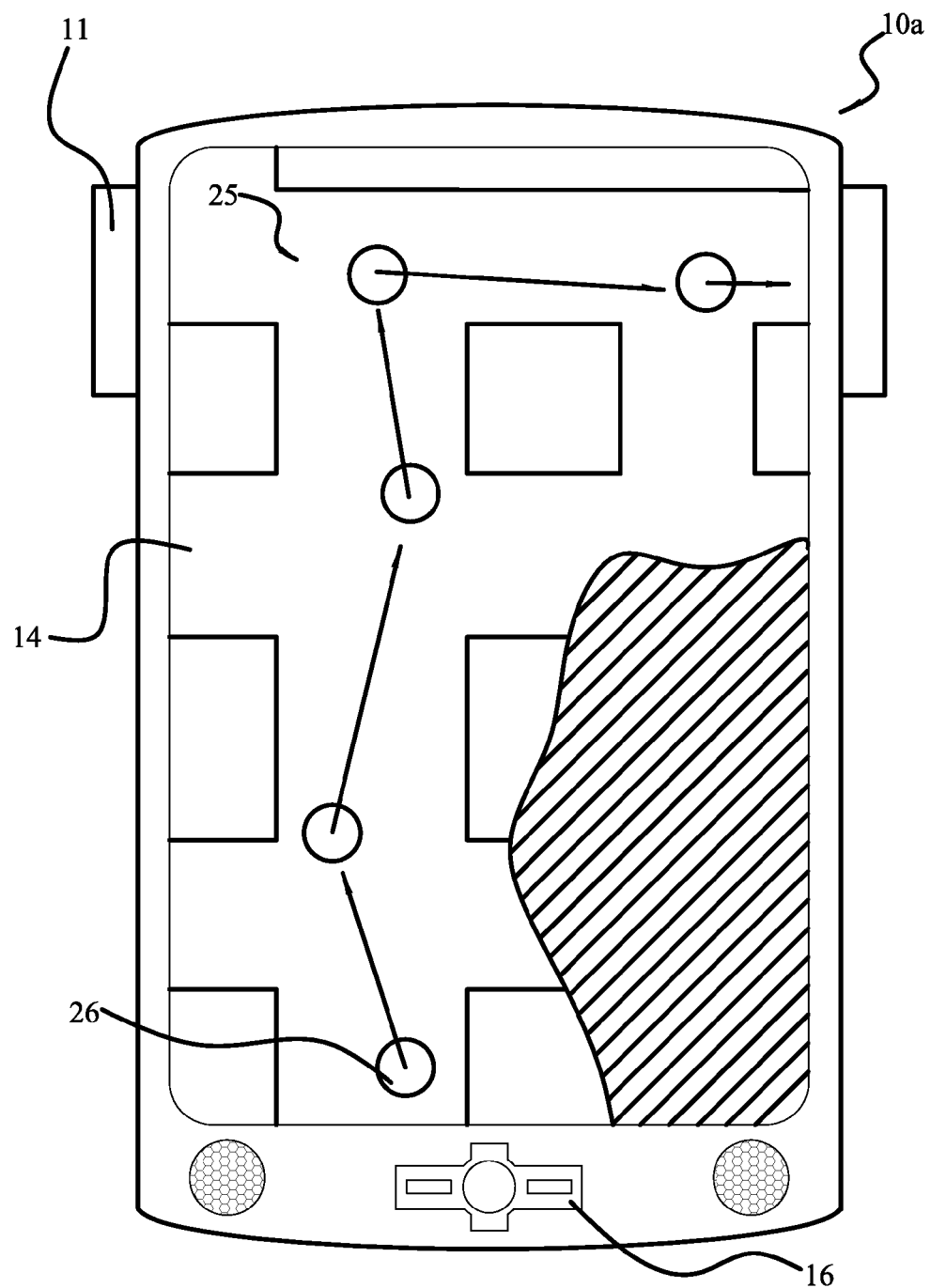

Please refer to FIG. 3A and FIG. 3D simultaneously, which illustrates a map building view for the embodiment of the present disclosure. The map building mode is suitable for a first system structure and a second system structure, hereby the present embodiment is using the first system structure for explanation, as recommended, please simultaneously refer to FIG. 1A and FIG. 1B also.

As illustrated by FIG. 3A, the user carries the movable electronic apparatus 10a to enter an unknown space area A, as FIG. 3B, the display unit 14 is devoid of displaying any area map.

As illustrated by FIG. 3C and FIG. 3D, where the user starts moving from a start point A in the spatial area, the distance sensing unit 11 senses the distance between the peripheral obstacles 31 and the movable electronic apparatus 10a so as to generate the aforesaid distance parameter 21, the inertial sensing unit 12 detects the displacement of the movable electronic apparatus 10a to generate at least a displacement parameter 22 and the tilt angle 23 of the movable electronic apparatus 10a. The parameter processing unit 13 combines the displacement parameter 22, the initial coordinate 24, the tilt angle 23, and the distance parameter 21, so as to build the area map 25 surrounding the movable electronics apparatus, and the display unit 14 displays the established area map 25. The parameter processing unit 13 further utilizes the displacement parameter 22 and the initial coordinate 24 so as to obtain a affixed positioning point 26 of the movable electronic apparatus 10a corresponding to the area map 25, and while displaying area map 25, the point 26 is also displayed.

The present embodiment is also suitable for the second system structure (as FIG. 1C and FIG. 1D illustrates) but it differs that while the second system structure is applied to the depicted embodiments in FIG. 3A~FIG. 3D, within the parameter processing unit 13 and the distance sensing unit 11, the inertial sensing unit 12, and the display unit 14, a communication operation can be taken via the micro-control unit 17, the first communication module 41, and the second communication module 42. Information such as the distance parameter 21, the displacement parameter 22, the area map 25, the initial coordinate 24, the affixed positioning point 26 are transmitted between the movable electronic apparatus 10b and the server apparatus 50 via the first communication module and the second communication module.

The movable electronic apparatus (10a, 10b) as stated in the present embodiments refers to cellular phone, PDA, or navigator, but not limited thereto. Movable electronic apparatus and handheld devices of all correlated types and application technologies' are also suitable.

Figure 4:
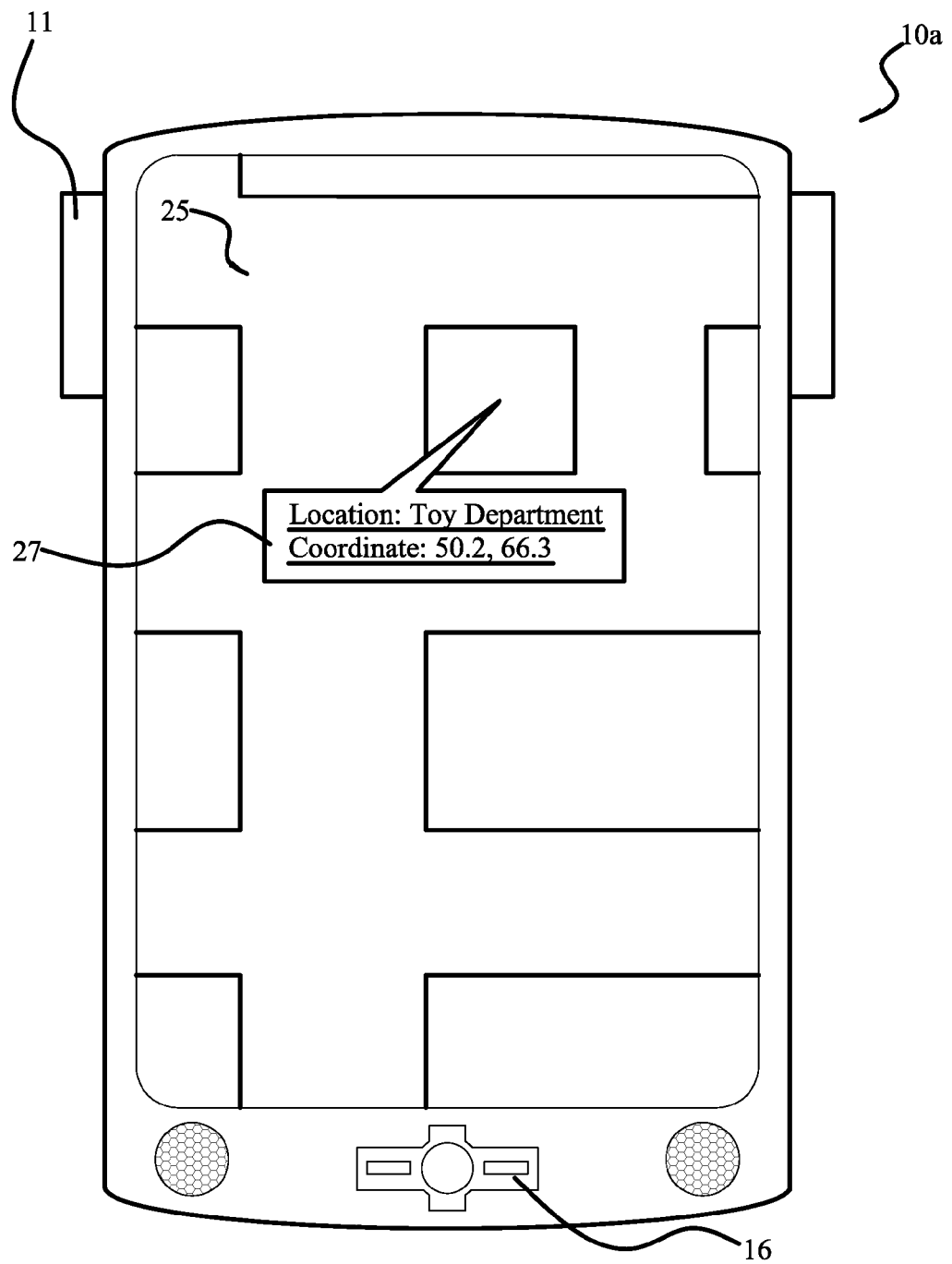
FIG. 4 relates to a view of positioning marking data for one of the embodiments of the present disclosure.

Please refer to FIG. 4, which depicts a view of positioning marking data for one of the embodiments of the present disclosure. The present embodiment is suitable for both the first system structure and the second system structure. Taking the first system structure as an example, please refer to FIG. 1A and FIG. 1B simultaneously; the movable electronic apparatus 10a comprises an input unit 16, on which the user can input a positioning marking data 27 in the area map 25. The data 27 comprises a plurality of data such as graphics, text, axis, and the like.

The present embodiment is also suitable for the second system structure, as FIG. 1C and FIG. 1D, where the movable electronic apparatus 10b comprises an input unit 16, for the user to input a positioning marking data 27, and the data 27 will be transmitted to the parameter processing unit 13 by the micro control unit 17 so as to combine the positioning marking data inside the area map 25. The data 27 comprises a plurality of data such as graphics, text, axis, and the like.

Figure 5:
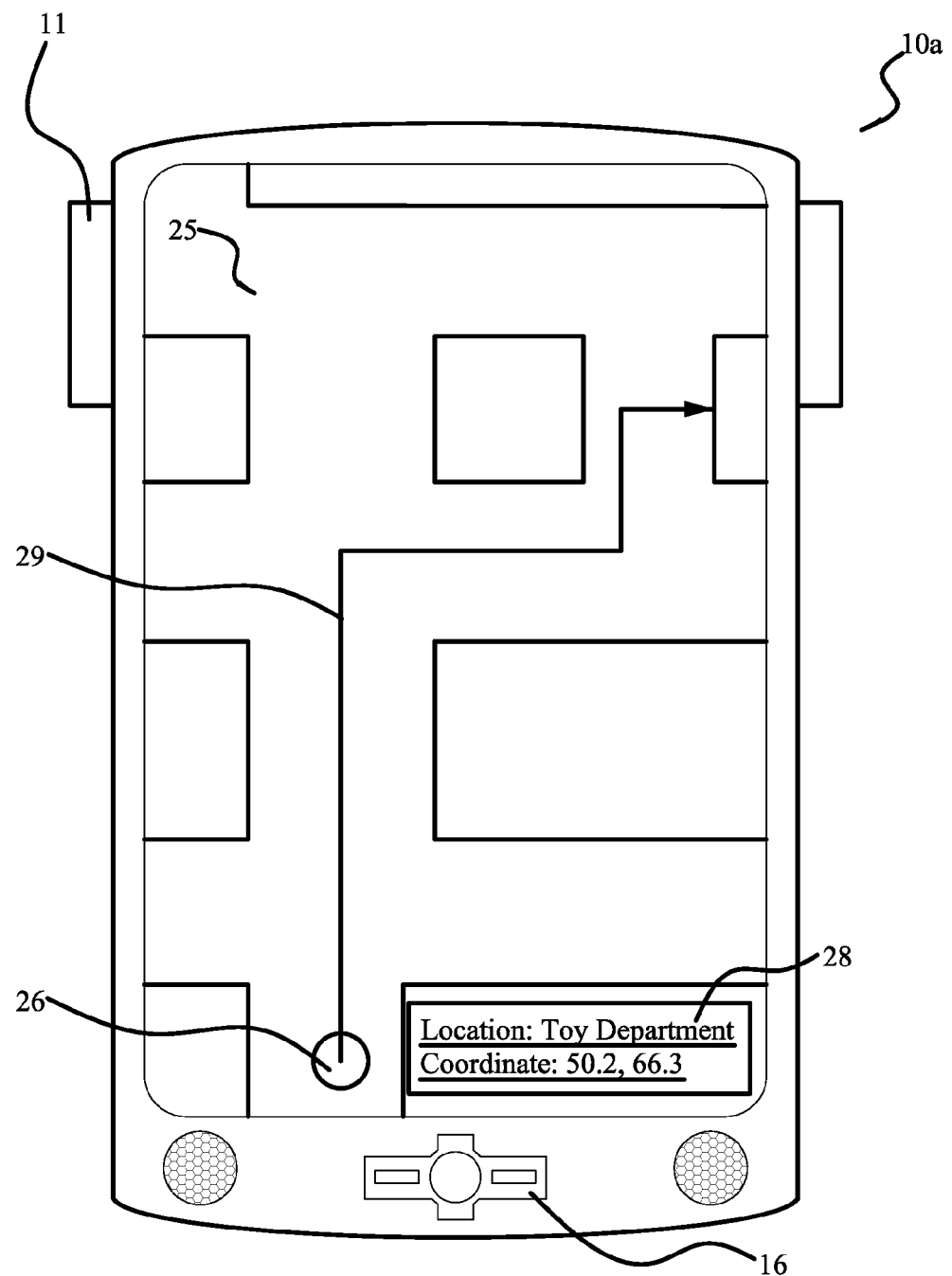
FIG. 5 relates to a view for navigation of the embodiment according to the present disclosure.

Please refer to FIG. 5, which illustrates a view for navigation of the embodiment according to the present disclosure. The present embodiment is suitable for the first system structure. Firstly, the first system structure is explained. Please refer to FIG. 1a and FIG. 1b simultaneously, the movable electronic apparatus 10a comprises an input unit 16, for facilitating the user to input a destination data 28, and the parameter processing unit 13 uses the destination data 28 and the affixed positioning point to calculate a navigation path 29. The destination data 28 comprises a plurality of data such as graphics, text, axis, and the like.

The present embodiment is also suitable for the second system structure, as FIGS. 1C and 1D suggests, the movable electronic apparatus 10b comprises an input unit 6, for facilitate the user to input the destination data 28. The destination data 28 will be transmitted to the parameter processing unit 29 by the micro control unit 17 so as to use the destination data 28 and the affixed positioning point 26 to calculate a navigation path 29. The destination data 28 comprises a plurality of data such as graphics, text, axis, and the like.

Figure 6A:
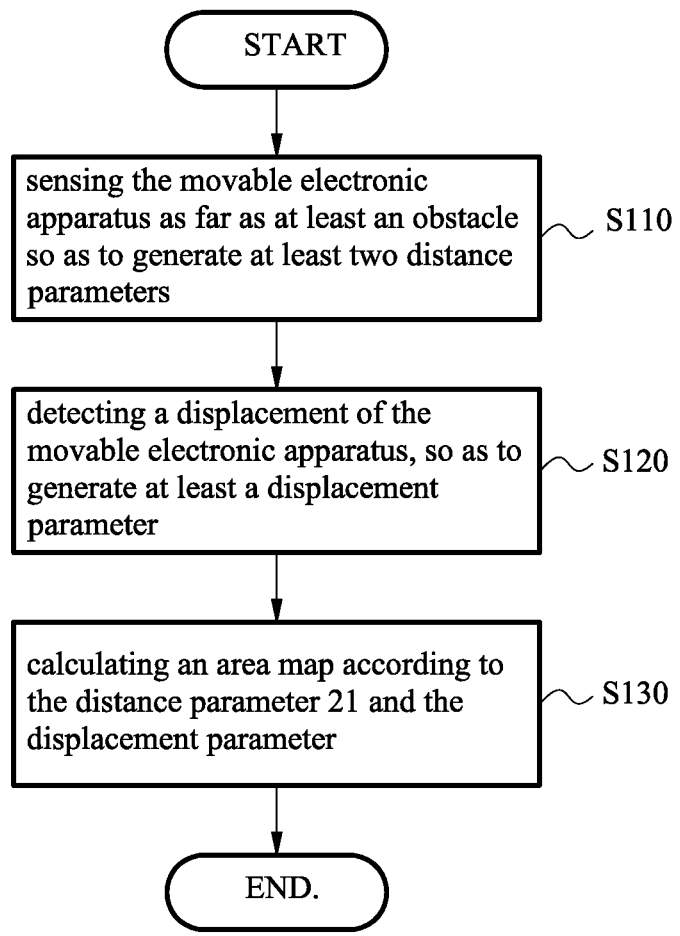
FIG. 6A depicts the flow chart for the map data establish method disclosed in the present disclosure.
Figure 6B:
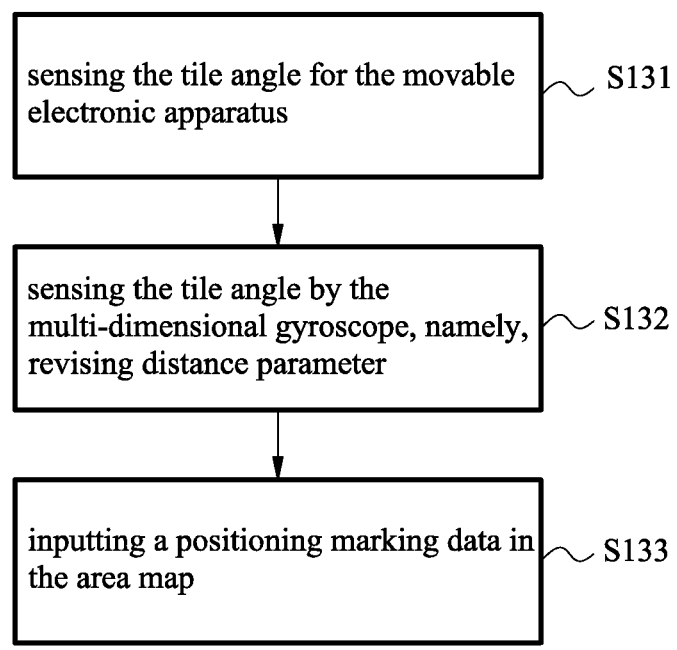
FIG. 6B and FIG. 6C depicts the detailed flow chart for the map data establish method disclosed in the present disclosure.
Figure 6C:
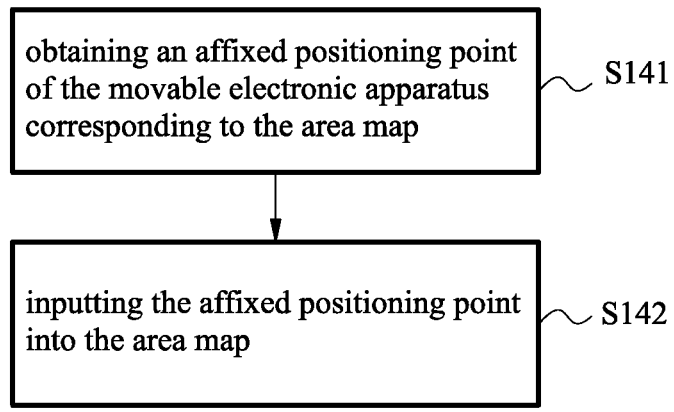

Please refer to FIG. 6A, which relates to the map building method of the present disclosure as well as FIG. 6B and FIG. 6C, which relates to the detailed flow chart of the map building method of the present disclosure. Meanwhile, please also refer to FIG. 1A~FIG. 5 for better understanding. The present embodiment of map building method is suitable for the first system structure and the second system structure. The present embodiment is explained in the first system structure, namely, the distance sensing unit 11, the inertial sensing unit 12, the parameter processing unit 13, and the display unit 14 are all installed on the movable electronic apparatus 10a, the method comprises the steps of: sensing the movable electronic apparatus 10a as far as at least an obstacle 31 so as to generate at least two distance parameters 21 (step: s110). The distance sensing unit 11 senses a distance between the movable electronic apparatus 10a and its peripheral obstacle 31 so as to generate at least two distance parameters 21. Distance sensing unit 11 can be infrared rays distance sensing unit or ultrasonic distance sensing unit, and be disposed at two sides of the movable electronic apparatus 10a, but the disposition and types are not limited thereto.

Detecting a displacement of the movable electronic apparatus 10a, so as to generate at least a displacement parameter 22 (step: s120). The inertial sensing unit 12 detect the displacement of the movable electronic apparatus 10a so as to generate at least a displacement parameter 22 (including the displacement velocity, displacement direction . . . etc for the movable electronic apparatus 10a). The inertial sensing unit 12 comprises a multi-dimensional accelerator 121 and a multi-dimensional gyroscope 122, where the multi-dimensional accelerator 121 can be a two-dimensional accelerator or a three-dimensional accelerator, and the multi-dimensional gyroscope 122 can be a two-dimensional gyroscope or a three-dimensional gyroscope.

An area map 25 is calculated according to the distance parameter 21 and the displacement parameter 22. (step: s130). The parameter processing unit 13 obtains the distance parameter 21 and the displacement parameter 22 provided by the distance sensing unit 11 and the inertial sensing unit 12 so as to calculate the area map 25, as illustrated in FIG. 6B, and the step: s130 further comprises the steps of: sensing the tile angle 23 for the movable electronic apparatus 10a (step: s131). Detecting the displacement speed of the movable electronic apparatus 10a by the multi-dimensional accelerator, and cooperating with a multi-dimensional gyroscope to determine the displacement direction of the movable electronic apparatus 10a, and sensing the tile angle 23 (alternatively call the gesture angle of the movable electronic apparatus 10a) by the multi-dimensional gyroscope, namely, revising distance parameter 21 (step: s132) by the parameter processing unit 13 according to the tile angle for the movable electronic apparatus. And, an input unit for the movable electronic apparatus 10a can be used to input a positioning marking data 27 in the area map 25 (step s133). The destination data 28 comprises a plurality of data such as graphics, text, axis, and the like.

As illustrated in FIG. 6C, FIG. 3C, and FIG. 3D, the map building method further comprises the steps as follows: obtaining an affixed positioning point 26 of the movable electronic apparatus 10a corresponding to the area map 25 by using the displacement parameter 22 (step: s141). Obtaining an affixed positioning point 26 of the movable electronic apparatus 10a corresponding to the area map 25 by using the displacement parameter 22 and the initial coordinate 24 processed by the parameter processing unit 13, and further inputting the affixed positioning point 26 into the area map 25 (step: s142).

Figure 6D:
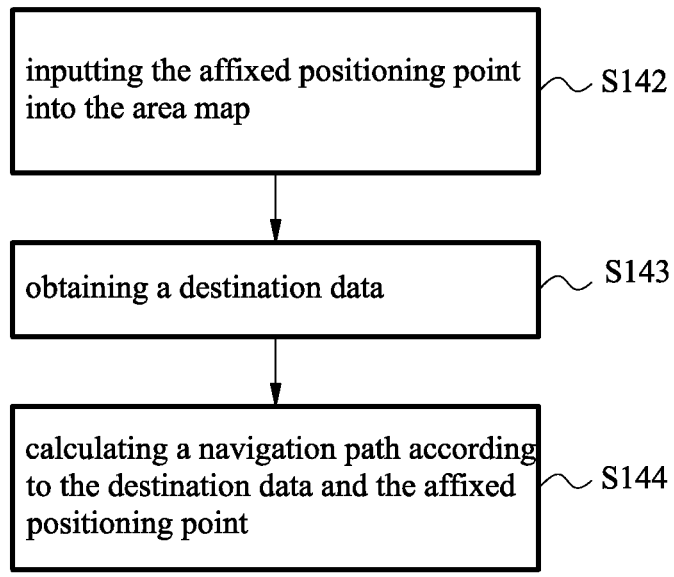
FIG. 6D depicts the flow chart for the navigation method in the map data establish method disclosed in the present disclosure.

Please simultaneously refer to FIG. 5 and FIG. 6D, which illustrates the navigation data input diagram of the map building method according to the present disclosure. After inputting the affixed positioning point 26, the method further comprises the steps of:

Obtaining a destination data 28 (step s143). The user input the destination data 28 via the input unit 16 of the movable electronic apparatus 10a, where the purpose data comprises a plurality of data such as graphics, text, axis, and the like. Calculating a navigation path 29 according to the destination data 28 and the affixed positioning point 26 by the parameter processing unit 13 (step s144), where the navigation path 29 is displayed by the display unit 14.

The aforesaid method as suggested by the FIG. 6A~FIG. 6D is also suitable for the second system structure, namely, the combination of the movable electronic apparatus 10b and the server apparatus 50.

As FIG. 6A, FIG. 6B, and FIG. 6C illustrates, the parameter processing unit 13 disposed in the server apparatus 50, and the movable electronic apparatus 10b and the server apparatus 50 are interconnected via the first communication module 41 and a second communication module 42 to undergo the interconnection. (to be wireline physical internet connection, wireless connection, and telecom connection, but not limited thereto), such that within the parameter processing unit 13 and the distance sensing unit 11, inertial sensing unit 12, and the display unit 14, a communication operation can be taken via a micro-control unit 17, the first communication module 41, and the second communication module 42. Data such as distance parameter 21, the displacement parameter 22, the area map 25, the initial coordinate 24, the affixed positioning point 26 are transmitted between the movable electronic apparatus 10b and the server apparatus 50 via the first communication module 41 and the second communication module 42.

Also as FIG. 6D illustrates, the movable electronic apparatus 10b further comprises an input unit 16, for the user to input a destination data 28. The destination data 28 will be transmitted to the parameter processing unit 13 by the micro-control unit 17 so as to facilitate the unit 13 to uses the destination data 28 and the affixed positioning point 26 to calculate a navigation path 29. The destination data 28 comprises a plurality of data such as graphics, text, axis, and the like.

The disclosure being thus described, it will be obvious that the same may be varied in many ways. Such variations are not to be regarded as a departure from the spirit and scope of the disclosure, and all such modifications as would be obvious to one skilled in the art are intended to be included within the scope of the following claims.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A map building system, comprising:
   at least two distance sensing units, installed in a movable electronic apparatus, for sensing a distance between the movable electronic apparatus and at least an obstacle so as to generate at least two distance parameters;
   an inertial sensing unit, installed in the movable electronic apparatus, for detecting a displacement for the movable electronic apparatus so as to generate at least a displacement parameter;
   a parameter processing unit, coupled to the distance sensing units and the inertial sensing unit, for calculating an area map according to the distance parameter and the displacement parameter; and
   a display unit, installed in the movable electronic apparatus, for displaying the area map,
   wherein the inertial sensing unit comprises a multi-dimensional accelerator and a multi-dimensional gyroscope; and
   wherein the inertial sensing unit senses a tilt angle for the movable electronic apparatus, and the parameter processing unit uses the tilt angle to revise the at least two distance parameters.

2. The map building system as recited in claim 1, wherein the parameter processing unit utilizes the displacement parameter so as to obtain an affixed positioning point of the movable electronic apparatus corresponding to the area map and display the affixed positioning point on the display unit.

3. The map building system as recited in claim 2, further comprising an input unit, installed in the movable electronic apparatus, for inputting a destination data, wherein the parameter processing unit uses the destination data and the affixed positioning point so as to calculate a navigation path.

4. The map building system as recited in claim 3, wherein the destination data is selected from the group consisting of graphics, text, and coordinates.

5. The map building system as recited in claim 1, further comprising a signal receiving unit, installed in the movable electronic apparatus, for receiving a satellite positioning signal, wherein the parameter processing unit determines the satellite positioning signal if lower than a certain threshold, when lower, records the movable electronic apparatus's position so as to form an initial coordinate to the inertial sensing unit, and the inertial sensing unit detects a displacement for the movable electronic apparatus according to the initial coordinate so as to generate at least a displacement parameter.

6. The map building system as recited in claim 1, further comprising an input unit installed in the movable electronic apparatus for inputting a position marking data in the area map.

7. The map building system as recited in claim 6, wherein the position marking data is selected from the group consisting of graphics, text, and coordinates.

8. The map building system as recited in claim 1, wherein the distance sensing unit is an infrared rays distance sensing unit or an ultrasonic distance sensing unit.

9. The map building system as recited in claim 1, wherein the movable electronic apparatus is cellular phone, personal digital assistance or navigator.

10. The map building system as recited in claim 1, wherein the parameter processing unit is installed in the movable electronic apparatus, and is electrically coupled to the distance sensing unit, the inertial sensing unit and the display unit.

11. The map building system as recited in claim 1, wherein the parameter processing unit is installed in a server apparatus, and the server apparatus and the movable electronic apparatus are in mutually internet linking so as to enact the parameter processing unit connects to the distance sensing unit, the inertial sensing unit, and the display unit.

12. A map building method, comprising steps of:
  sensing a movable electronic apparatus as far as at least an obstacle by a distance sensing unit, so as to generate at least two distance parameters;
  detecting a displacement of the movable electronic apparatus by an inertial sensing unit, so as to generate at least a displacement parameter;
  calculating an area map according to the distance parameters and the displacement parameter by a parameter processing unit, detecting a tilt angle for the movable electronic apparatus; and
  revising the distance parameter according to the tilt angle.

13. The map building method as recited in claim 12, further comprising:
  obtaining an affixed positioning point of the movable electronic apparatus corresponding to the area map by using the displacement parameter; and
  inputting the affixed positioning point into the area map.

14. The map building method as recited in claim 12, further comprising:
  obtaining a destination data; and
  calculating a navigation path according to the destination data and the affixed positioning point.

15. The map building method as recited in claim 14, wherein the destination data comprises a plurality of data such as graphics, text, axis, and the like.

16. The map building method as recited in claim 12, further comprising the step of:
  inputting a positioning marking data in the area map.

17. The map building method as recited in claim 16, wherein the positioning marking data comprises a plurality of data such as graphics, text, axis, and the like.

18. A computer readable medium, operable to execute a map building method for a movable electronic apparatus to read program on the medium, the method comprises the steps of:
  sensing a distance between the movable electronic apparatus and at least an obstacle so as to generate at least two distance parameters;
  detecting a displacement for the movable electronic apparatus so as to generate at least a displacement parameter;
  detecting the tilt angle for the movable electronic apparatus;
  revising the distance parameter; and
  calculating an area map by the distance parameter and the displacement parameter and displaying the area map.

19. The computer readable medium as recited in claim 18, wherein the method further comprises:
  obtaining a destination data; and
  calculating a navigation path according to the destination data and the affixed positioning point.

20. The computer readable medium as recited in claim 19, wherein the destination data is selected from the group consisting of graphics, text, and coordinates.

21. The computer readable medium as recited in claim 18, wherein the method further comprising the step of: inputting a positioning marking data in the area map.

22. The computer readable medium as recited in claim 21, wherein the position marking data is selected from the group consisting of graphics, text, and coordinates.

* * * * *